United States Patent [19]

Visinand

[11] Patent Number: 4,613,265

[45] Date of Patent: Sep. 23, 1986

[54] SCREW WITH FILLER-RECEIVING HEAD

[76] Inventor: Jean-Claude Visinand, 3535 Papineau, Apt. 2405, Montreal, Quebec, Canada, H2K 4J9

[21] Appl. No.: 595,350

[22] Filed: Mar. 30, 1984

[51] Int. Cl.⁴ .............................................. F16B 39/02
[52] U.S. Cl. ..................................... 411/83; 411/120; 411/372; 411/402
[58] Field of Search .............. 411/116, 117, 118, 119, 411/120, 121, 122, 123, 124, 402, 403, 404, 405, 406, 407, 408, 409, 410, 371, 372, 373, 81, 83, 374–377, 910; 81/436, 451, 437, 460, 461, 90 C, 90 D, 121 A

[56] References Cited

U.S. PATENT DOCUMENTS

| | | | |
|---|---|---|---|
| 255,459 | 3/1882 | Rogers | 411/403 |
| 374,701 | 12/1887 | Quinby | 411/402 |
| 887,382 | 5/1908 | Diplock | 411/120 |
| 968,783 | 8/1910 | Moore | 411/409 |
| 1,269,971 | 6/1918 | Smith | 81/90 D |
| 1,330,098 | 2/1920 | Smith | 411/405 |
| 1,455,512 | 5/1923 | Tully | 411/119 X |
| 2,363,665 | 11/1944 | George | 411/373 |
| 2,600,924 | 6/1952 | Royer | 81/461 X |
| 2,619,861 | 12/1952 | Wanamaker | 81/90 C |
| 2,668,466 | 2/1954 | Schofield | 81/90 C |
| 2,813,450 | 11/1957 | Dzus | 411/403 |
| 3,065,662 | 11/1962 | Spoehr | 411/910 X |
| 3,151,512 | 10/1964 | Charczenko | 81/176.2 |
| 3,236,275 | 2/1966 | Smith | 81/460 |
| 3,369,441 | 2/1968 | Kosar | 411/410 |
| 4,128,038 | 12/1978 | Urwin | 411/403 |
| 4,237,754 | 12/1980 | Battrick | 81/439 |
| 4,285,255 | 8/1981 | Winfrey | 81/451 |
| 4,430,035 | 2/1984 | Rodseth | 81/90 C X |
| 4,480,514 | 11/1984 | Ponziani | 81/90 C X |

FOREIGN PATENT DOCUMENTS

| | | | |
|---|---|---|---|
| 542213 | 11/1955 | Belgium | 411/403 |
| 324061 | 12/1902 | France | 411/83 |
| 954633 | 12/1949 | France | 81/461 |
| 92379 | 9/1968 | France | 411/116 |
| 608864 | 9/1960 | Italy | 411/373 |
| 7907153 | 4/1980 | Netherlands | 411/371 |
| 5265 | 12/1881 | United Kingdom | 411/403 |
| 503055 | 4/1976 | U.S.S.R. | 411/83 |

Primary Examiner—Gary L. Smith
Assistant Examiner—Adrian H. Whitcomb, Jr.
Attorney, Agent, or Firm—Schwartz, Jeffery, Schwaab, Mack, Blumenthal & Evans

[57] ABSTRACT

A screw-type fastener having a threaded shank and a head integral therewith, and adapted to be driven into a structure by axial rotation about its longitudinal central axis in a driving direction such that the head is countersunk, is improved by forming the head with at least two ribs protruding from the surface thereof and extending radially outward from the central axis. The ribs define a corresponding number of sector-shaped cavities adapted to receive a filler material for engaging the ribs so as to prevent the fastener from axially rotating in a direction opposite the driving direction and to thereby secure the fastener against loosening.

6 Claims, 5 Drawing Figures

U.S. Patent   Sep. 23, 1986   4,613,265
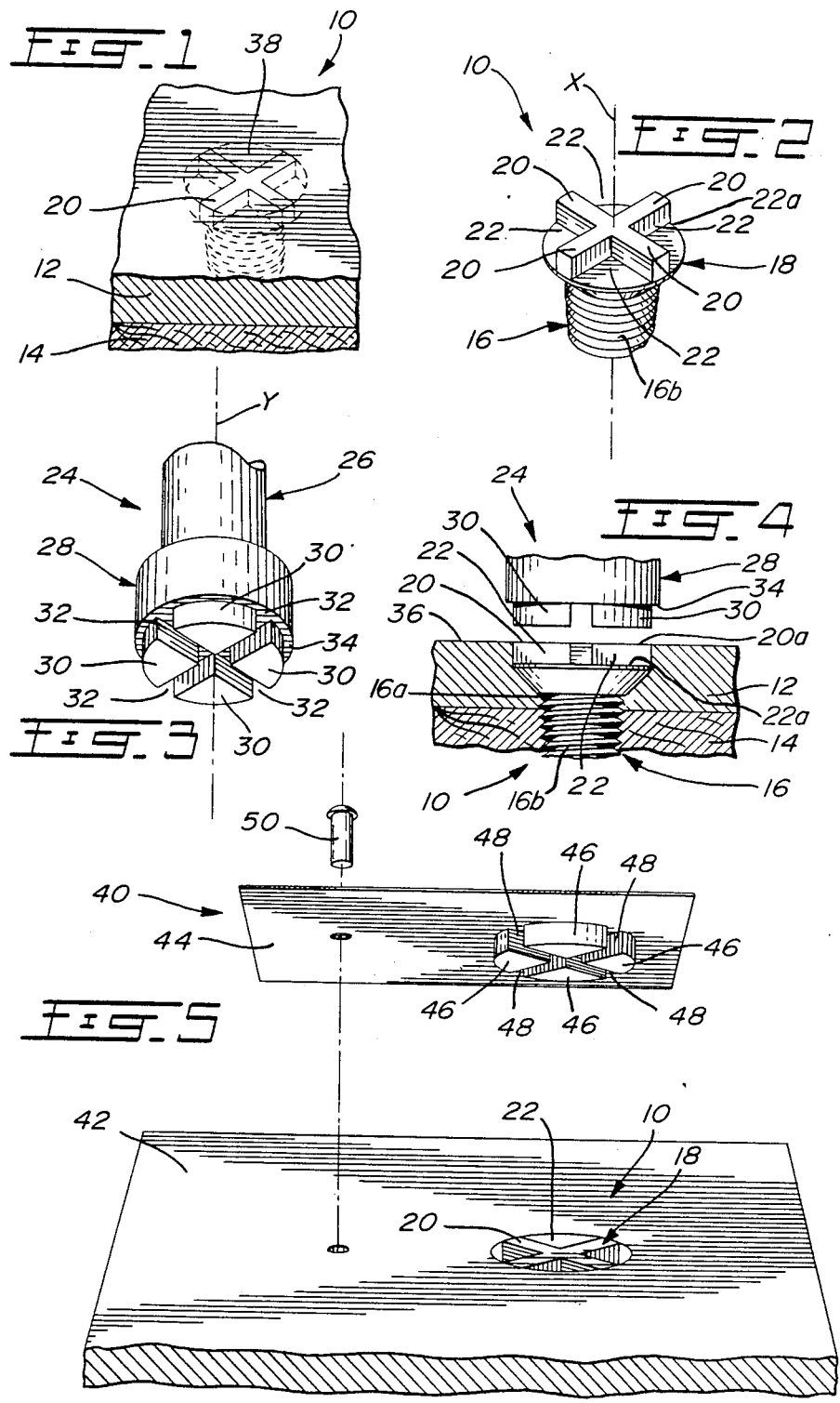

SCREW WITH FILLER-RECEIVING HEAD

BACKGROUND OF THE INVENTION

The present invention relates to improvements in fasteners. More particularly, the invention is directed to an improved screw-type fastener having a threaded shank and a head integral therewith, and adapted to be driven into a structure by axial rotation about its longitudinal central axis in a driving direction such that the head is countersunk.

Hitherto known screw-type fasteners suffer from a major drawback in that they undergo loosening after a certain period of time. Indeed, environmental conditions such temperature and/or humidity variations, vibrations, etc. cause such fasteners to axially rotate in a direction opposite the driving direction, resulting in loosening. This is especially true in the case of screws used for securing gyproc panels to a wooden structure, as well as screws used in watches, pressure gauges and compressors, for example, which are subject to vibrations.

Although the art is abundant in screws of various kinds, some even of intricate designs, none of the screw-type fasteners proposed so far has solved the above problem.

SUMMARY OF THE INVENTION

It is therefore an object of this invention to overcome the above-mentioned drawback and to provide a screw-type fastener which can be tightly locked in place and will not unscrew itself in time.

It is a further object of the invention to provide a tool for driving such a screw-type fastener.

According to one aspect of the invention, there is provided in a screw-type fastener having a threaded shank and a head integral therewith, and adapted to be driven into a structure by axial rotation about its longitudinal central axis in a driving direction such that the head is countersunk, the improvement wherein the head is formed with at least two ribs protruding from the surface thereof and extending radially outward from the central axis. The ribs define a corresponding number of sector-shaped cavities adapted to receive a filler material for engaging the ribs so as to prevent the fastener from axially rotating in a direction opposite the driving direction and to thereby secure the fastener against loosening.

Thus, by providing the fastener head with ribs defining filler-receiving cavities, such cavities may be filled with filler material once the fastener is in place. Due to the ribs and the presence of filler material in the cavities, the fastener will be tightly locked in place and will not unscrew itself in time, as opposed to conventional screws which after a certain period of time will loosen.

In a preferred embodiment of the invention, the head has a circular peripheral edge and each rib is rectangular in cross-section and extends radially to terminate flush with the peripheral edge. Preferably, the head is formed with four ribs which are disposed at 90° relative to one another.

According to another aspect of the invention, there is also provided a tool for driving a screw-type fastener as defined above. The tool of the invention comprises a shank member with a drive head at one end thereof. The drive head is formed with at least two sector-shaped protuberances arranged in spaced-apart relationship to define a corresponding number of channels adapted to receive the ribs of the head of the fastener with the sector-shaped protuberances fitting into the sector-shaped cavities of the fastener head so as to engage the ribs for driving the fastener.

The drive head is preferably formed with an annular shoulder adjacent a peripheral edge thereof. This shoulder is adapted to abut the structure into which the fastener is driven, whereby to act as a stop to limit the countersinking of the fastener head into the structure.

Where the structure into which the fastener is driven is made of metal, use is preferably made of a lock member instead of filler material for securing the fastener against loosening. Such a lock member may comprise a plate element having on a side thereof facing the structure at least two sector-shaped protuberances arranged in spaced-apart relationship to define a corresponding number of channels adapted to receive the ribs of the head of the fastener with the sector-shaped protuberances fitting into the sector-shaped cavities of the fastener head so as to engage the ribs for locking the fastener in place. A means for securing the plate element to the structure is also provided, such as a rivet.

BRIEF DESCRIPTION OF THE DRAWINGS

Further features and advantages of the invention will become more readily apparent from the following description of preferred embodiments thereof as illustrated by way of examples in the accompanying drawings, in which:

FIG. 1 is a perspective view showing how a screw-type fastener according to the invention may be used to secure a gyproc panel to a wooden structure, while being tightly locked in place;

FIG. 2 is a fragmentary perspective view of the screw-type fastener shown in FIG. 1;

FIG. 3 is a fragmentary bottom perspective view of a tool according to the invention for driving the screw-type fastener illustrated in FIG. 2;

FIG. 4 is a fragmentary part-sectional elevation view showing how the tool of FIG. 3 may be used to drive the screw-type fastener shown in FIG. 2; and FIGS. 5 is an exploded perspective view showing how a lock member may be used to secure the screw-type fastener of FIG. 2 against loosening in a metallic structure.

DESCRIPTION OF PREFERRED EMBODIMENTS

Referring first to FIGS. 1 and 2, there is illustrated a screw which is generally designated by reference numeral 10 and seen driven into a gyproc panel 12 for securing same to a wooden structure 14. As best shown in FIG. 2, the screw 10 has a threaded shank 16 and a head 18 integral therewith. The head 18 is formed with four ribs 20 protruding from the surface thereof and disposed at 90° relative to one another. Each rib 20 is rectangular in cross-section and extends radially outward from the longitudinal central axis X of the screw to terminate flush with the circular peripheral edge of the head 18. The ribs 20 define a corresponding number of sector-shaped cavities 22 adapted to receive a filler material.

Turning to FIGS. 3 and 4, the tool 24 used for driving the screw 10 comprises a shank member 26 with a drive head 28. The drive head 28 is formed with four sector-shaped protuberances 30 arranged diametrically opposite one another in spaced-apart relation and defining a corresponding number of channels 32 disposed at 90° to each other. The channels 32 are adapted to receive the ribs 20 of the screw head 18 with the protuberances 30 fitting into the cavities 22 of the screw head so as to engage the ribs 20 for driving the screw 10. The screw is driven into the gyproc panel 12 and underlying wooden structure 14 by axially rotating the shank member 26 of the tool about its longitudinal central axis Y so as to correspondingly rotate the screw 10 in the driving direction such that the screw head 18 is countersunk. The drive head 28 of the tool 24 is conveniently formed with an annular shoulder 34 adjacent the peripheral edge thereof, the shoulder 34 being adapted to abut the surface 36 of the gyproc panel 12 whereby to act as a stop to limit the countersinking of the screw head 18 into the panel 12. As shown in FIG. 4, the ribs 20 of the countersunk head 18 lie flush with the surface 36.

As seen in FIG. 4, the distance from the top 16a of the screw threads 16b to the substantially planar surface 22a of the head or base of the cavity 22 is slightly less than one-half the distance from the screw threads to the top of the ribs 20a (i.e., the frustro-conical countersink head 18). In other words, each rib projects from the surface of the head a distance equal to at least one-half the thickness of the screw head.

Once the screw 10 is in place, the cavities 22 are filled with a filler material 38 such as plaster which adheres to the inner peripheral wall of the screw bore while engaging the ribs 20 so as to prevent the screw from axially rotating in a direction opposite the driving direction, thereby securing the screw 10 against loosening, as shown in FIG. 1.

FIG. 5 shows a lock member 40 for use in combination with the screw 10 where the structure 42 into which the screw is driven is made of metal. As shown, the lock member 40 comprises a metal plate element 44 having on its side facing the structure 42 four sector-shaped protuberances 46 arranged diametrically opposite one another in spaced-apart relation and defining a corresponding number of channels 48 disposed at 90° to each other. The channels 48 are adapted to receive the ribs 20 of the countersunk screw head 18 with the protuberances 46 fitting into the cavities 22 of the screw head so as to engage the ribs 20 for locking the screw 10 in place. The plate element 44 is riveted to the structure 42 by means of the rivet 50. Since the metal plate element 44 is slightly resilient, it can be bent in a direction away from the structure 42 and shifted laterally about the rivet 50 which thus constitutes a pivot, so as to gain access to the screw 10. The plate element 44 can thereafter be shifted back into place with the protuberances 46 being maintained in locking engagement with the ribs 20 of the screw head by the resilient force exerted by the plate element 44.

It should be noted that in the case of the metallic structure 42, one can do without the lock member 40 and use instead a filler material such as LOCTITE (trade mark) to fill the cavities 22.

Although the screw 10 illustrated comprises four ribs 20, it is apparent that such a screw may instead comprise only two ribs, in which case such ribs may be axially aligned along a common axis to define two hemicircular cavities. Aletrnatively, there may be three ribs 20 disposed at 120° to each other.

I claim:

1. A lock member in combination with a screw-type fastener having a threaded shank and a head integral therewith, and adapted to be driven into a structure by axial rotation about its longitudinal central axis in a driving direction such that the head is countersunk, said head being formed with at least two ribs protruding from the surface of the head thereof and extending radially outward from said central axis, said ribs defining a corresponding number of sector-shaped cavities adapted to receive means for engaging said ribs so as to prevent said fastener from axially rotating in a direction opposite said driving direction and to thereby secure said fastener against loosening, wherein said lock member comprises a resilient plate element having on a side thereof facing the structure into which said fastener is driven at least two sector-shaped protuberances arranged in spaced-apart relationship to define a corresponding number of channels adapted to receive the ribs of the head of said fastener with said sector-shaped protuberances fitting into said sector-shaped cavities of said fastener head thereby forming said means for engaging said ribs for locking said fastener in place, and a single pivot means for securing said plate element to said structure, said plate element being sufficiently resilient to permit said plate element to be first bent in a direction away from said structure and clearing said channels and then rotated laterally about said pivot means to allow access to said fastener, and permitting reengagement with said channels by the resilient force exerted by said plate element.

2. The combination as claimed in claim 1, wherein said head has a circular peripheral edge and each said rib is rectangular in cross-section and extends radially to terminate flush with said peripheral edge.

3. The combination as claimed in claim 2, wherein said head is formed with four said ribs, said ribs being disposed at 90° relative to one another.

4. The combination as claimed in claim 1, wherein said structure and said plate element are made of metal.

5. The combination as claimed in claim 4, wherein said first means comprises a rivet.

6. The combination as defined in claim 1 wherein said head is formed with four ribs, and said ribs being disposed at about 90° to one another.

* * * * *